US011609926B1

(12) United States Patent
Kannan et al.

(10) Patent No.: US 11,609,926 B1
(45) Date of Patent: Mar. 21, 2023

(54) METHODS AND SYSTEMS FOR SOCIAL AWARENESS

(71) Applicant: MASSACHUSETTS MUTUAL LIFE INSURANCE COMPANY, Springfield, MA (US)

(72) Inventors: Gopika Kannan, West Hartford, CT (US); Jennifer Fabrizi, Amherst, MA (US); Robert Polkowski, Boston, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 322 days.

(21) Appl. No.: 16/927,539

(22) Filed: Jul. 13, 2020

Related U.S. Application Data

(63) Continuation of application No. 15/623,160, filed on Jun. 14, 2017, now Pat. No. 10,713,268, which is a
(Continued)

(51) Int. Cl.
| | |
|---|---|
| *G06F 16/25* | (2019.01) |
| *G06Q 10/06* | (2023.01) |
| *G06Q 50/00* | (2012.01) |
| *G06F 16/248* | (2019.01) |
| *G06N 5/02* | (2023.01) |
| *H04L 67/10* | (2022.01) |
| *G06Q 10/101* | (2023.01) |
| *G06N 5/022* | (2023.01) |

(52) U.S. Cl.
CPC ............ *G06F 16/25* (2019.01); *G06F 16/248* (2019.01); *G06N 5/02* (2013.01); *G06Q 10/06* (2013.01); *G06Q 10/101* (2013.01); *G06Q 50/01* (2013.01); *H04L 67/10* (2013.01); *G06N 5/022* (2013.01)

(58) Field of Classification Search
CPC ....... G06F 16/25; G06F 16/248; G06Q 10/06; G06Q 10/101; G06N 5/02
See application file for complete search history.

(56) References Cited

U.S. PATENT DOCUMENTS

| | | | | |
|---|---|---|---|---|
| 5,913,201 A | * | 6/1999 | Kocur | ............ G06Q 10/063118 705/7.17 |
| 8,234,143 B1 | * | 7/2012 | Brewer | .............. G06Q 10/0631 705/7.17 |

(Continued)

*Primary Examiner* — Etienne P Leroux
(74) *Attorney, Agent, or Firm* — Foley & Lardner LLP

(57) ABSTRACT

The embodiments described herein relate to a method and system for social awareness which may be based on social networks for knowledge exchange. More specifically, the embodiments may refer to specific social networks with social elements in the user interface based on knowledge exchange, social theory of group memberships within an enterprise or organization context. In addition, the disclosed group memberships may be predicated upon many different types of relationships. Furthermore, the social network (through a program interface) may provide to users the required specific project resources (project team members), which may be need to develop a better project performance according to the experience and knowledge of the new members. The required project team members may match with the attributes and criteria established during the project planning.

20 Claims, 6 Drawing Sheets

Related U.S. Application Data continuation of application No. 14/571,866, filed on Dec. 16, 2014, now Pat. No. 9,684,698.

(60) Provisional application No. 61/918,930, filed on Dec. 20, 2013.

(56) References Cited

U.S. PATENT DOCUMENTS

| | | | |
|---|---|---|---|
| 8,417,502 B1 | 4/2013 | Anati et al. | |
| 9,609,072 B2 * | 3/2017 | Louis | H04L 51/52 |
| 2001/0054032 A1 | 12/2001 | Goldman et al. | |
| 2004/0006566 A1 | 1/2004 | Taylor et al. | |
| 2004/0199756 A1 | 10/2004 | Graves et al. | |
| 2006/0047558 A1 | 3/2006 | Uchiyama et al. | |
| 2007/0136429 A1 | 6/2007 | Fine et al. | |
| 2008/0301105 A1 | 12/2008 | Chen et al. | |
| 2009/0024979 A1 | 1/2009 | Chessell et al. | |
| 2009/0215469 A1 | 8/2009 | Fisher et al. | |
| 2009/0307129 A1 | 12/2009 | Matkowsky et al. | |
| 2010/0174578 A1 | 7/2010 | Duffy et al. | |
| 2010/0274667 A1 * | 10/2010 | Lanham | G06Q 30/0251 707/E17.103 |
| 2010/0287023 A1 | 11/2010 | Knobel et al. | |
| 2010/0325214 A1 | 12/2010 | Gupta | |
| 2011/0055264 A1 | 3/2011 | Sundelin et al. | |
| 2011/0154209 A1 * | 6/2011 | Fan | G06F 16/9535 707/784 |
| 2012/0215795 A1 * | 8/2012 | Phelon | G06Q 10/1053 707/E17.014 |
| 2012/0226701 A1 * | 9/2012 | Singh | G06Q 50/01 709/204 |
| 2012/0317102 A1 | 12/2012 | Hu et al. | |
| 2013/0007036 A1 | 1/2013 | Childs et al. | |
| 2013/0073328 A1 | 3/2013 | Ehrler et al. | |
| 2013/0080427 A1 * | 3/2013 | Cross | G06Q 30/0224 707/E17.064 |
| 2013/0086495 A1 | 4/2013 | Guzansky et al. | |
| 2013/0091456 A1 | 4/2013 | Sherman et al. | |
| 2013/0110641 A1 | 5/2013 | Ormont et al. | |
| 2013/0124477 A1 | 5/2013 | Sorensen et al. | |
| 2013/0218619 A1 | 8/2013 | Friedlander et al. | |
| 2013/0322613 A1 | 12/2013 | Clayton et al. | |
| 2014/0075004 A1 | 3/2014 | Van Dusen et al. | |
| 2014/0149507 A1 * | 5/2014 | Redfern | G06Q 50/01 709/204 |
| 2014/0188681 A1 * | 7/2014 | Shahghasemi | G06Q 20/384 705/37 |
| 2014/0343988 A1 | 11/2014 | Ashtiani et al. | |
| 2017/0060856 A1 * | 3/2017 | Turtle | G06F 16/00 |

\* cited by examiner

METHODS AND SYSTEMS FOR SOCIAL AWARENESS

CROSS-REFERENCE TO RELATED APPLICATIONS

This application is a continuation of U.S. patent application Ser. No. 15/623,160, filed Jun. 14, 2017 (now U.S. Pat. No. 10,713,268), which is a continuation application of U.S. patent application Ser. No. 14/571,866, filed Dec. 16, 2014 (now U.S. Pat. No. 9,684,698), which claims priority to U.S. Provisional Patent Application Ser. No. 61/918,930, filed Dec. 20, 2013, each of which are hereby incorporated by reference in its entirety for all purposes.

TECHNICAL FIELD

The present disclosure relates in general to knowledge management, and more particularly, to a social awareness tool based on the selection of project resources in terms of knowledge experience.

BACKGROUND

Human intelligence and knowledge may be becoming increasingly digitized. Knowledge may be nowadays widely recognized as a core asset for organizations around the world and as a tool for better benefits. Currently, in an information-based world, knowledge-workers must have access to the knowledge and the tools they need to make better, faster, and more-informed decisions to improve their productivity, to enhance customer relationships, and to make their businesses more competitive.

Organizations may usually use a variety of methods and systems to discover and maintain knowledge and new ideas for the benefit or improvement of its personnel and business. One conventional approach include the generation of a manual, book, electronic mail (email), software, etc. in order to share such knowledge.

However, the majority of new ideas and discovered knowledge may exist in the minds of an organization's personnel. As such, there may be difficult for individuals to learn of others' ideas and communicate their own. Consequently, knowledge may not be readily accessible by other members of an organization or project.

Another conventional approach in the art of knowledge management may be the social media network environment, which may be used for topics of information to impact social measurements, thereby bringing generational awareness to improve community cultural and economic values. The network environment may be related to a platform for sharing knowledge and/or experiences in order to obtain intangible asset for creating and sustaining competitive advantages within organizations. However, the sharing knowledge may be considered as the major challenge in the field of knowledge management because some individuals or employees may tend to resist sharing their knowledge with the rest of the organization. Moreover, the disclosed platform for sharing knowledge and/or experience may extract information from a database, and analyze queried occurrences to identify stored patterns for communications through a centralized system in an effort to reveal information not commonly seen.

For the aforementioned reasons, there is a need for a method for social awareness, where any suitable social networks could be used as an effective source of project resources based on knowledge and experience in a given environment under specific conditions.

SUMMARY

The embodiments describe a system and method for social awareness that may be based on social networks for knowledge exchange. An exemplary embodiment may refer to a component from a knowledge ecosystem, which may be used to dynamically select the suitable member(s) of a specific project team, as well as a knowledge management system, which may manage and process the flow of information within the knowledge ecosystem. The knowledge ecosystem may include the ability to connect and the associations based on an individual expertise into the realm or flow of work (enabling experts to connect and work together). Consequently, the knowledge ecosystem may allow to connect the relevant individuals associated with certain tasks at hand, and the knowledge that may be required or with uncovering unknown knowledge.

In one embodiment, a computer-implemented method comprises receiving, by a computer, an input of a plurality of project attributes for a project; generating, by the computer, a record of the project having the plurality of project attributes; searching, by the computer, a social network base to match at least one of the project attributes in the record of the project with an individual associated with knowledge in a record in the social network base, wherein the knowledge has at least one of the project attributes; and in respond to searching, automatically generating, by a computer, a record of a team by selecting the individual as a team member of the project when there is a match.

In another embodiment, a system comprises a social network database; a terminal configured to provide an interface to the social network database, receive at least one parameter for a project, and search the social network for an individual associated with knowledge that satisfies the at least one parameter; and a database configured to store records for a plurality of individuals, provide information to the terminal about the plurality of individuals when the terminal is searching the social network database, and update the records to associate at least one of the individuals with the project when the individual is associated with knowledge that satisfies at least one parameter of the project.

In yet another embodiment, a computer-implemented method comprises receiving, by a computer, an input of at least one project having involvement by a user; determining, by the computer, a plurality of attributes of the user in a record of the user; analyzing, by the computer, each of the at least one project and the plurality of attributes of the user to determine a set of skills for each of the at least one project; and displaying, by the computer, a graphical user interface to the user presenting a skill level of the user compared to the set of skills. The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

Numerous other aspects, features of the present disclosure may be made apparent from the following detailed description.

Definitions

As used here, the following terms may have the following definitions:

"Knowledge" refers to information, acquired or derived by one or more participants in one or more projects for use in one or more other projects.

"Social network" refers a plurality of individuals or entities organized in specific groups, where these individuals or entities may interact, collaborate, and share knowledge.

"Knowledge management" refers to the process of acquiring, organizing, storing, sharing and using knowledge by organizations or individual.

"Social awareness" refers to a knowledge management tool, which may be used to leverage personalized knowledge sharing, as well as to engage in any suitable activity or project, specific groups or individuals with a specific knowledge in any suitable field.

"Knowledge map" refers to a diagram used for visualizing flow of knowledge and duties before, during and after a project execution.

"Knowledge ecosystem" refers to people creating knowledge through networks of collaboration that may be supported by a technology network of knowledge bases and communication links.

"Knowledge content" refers to the work output produced by the members of a knowledge ecosystem, where this content may have a life cycle that matures from tribal knowledge to conventional wisdom through the structure of the ecosystem. Knowledge content may be in the form of a piece of documentation such as memos, notes, emails, directories, articles, white papers, and case studies, among others, where this documentation may be relevant to execute tasks of interest within an organization.

"Knowledge base" refers to a collection of knowledge content saved in an electronic storage system and that may be later retrieved for implementation in future projects.

"Knowledge based assignment module" refers to a module which may be part of a knowledge ecosystem which is responsible to gather necessary information to perform an optimal assignment of a set of employees to a set of projects.

"Psychographic information" refers to characteristics such as attitude, perception, and motivation of an employee towards work.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
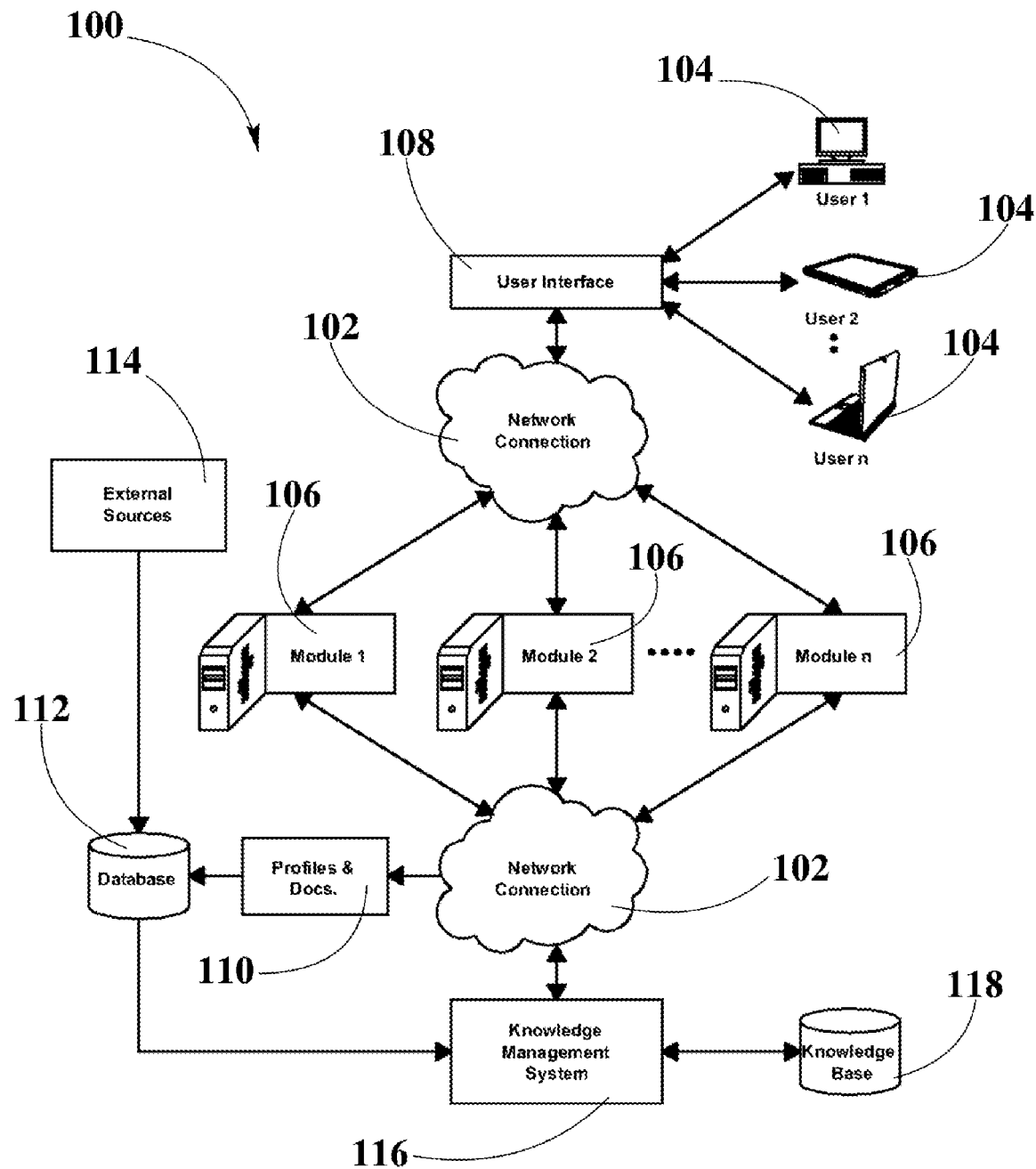
FIG. 1 is a system architecture for a knowledge ecosystem, according to an embodiment.

The present disclosure is here described in detail with reference to embodiments, which form a part here. Other embodiments may be used and/or other changes may be made without departing from the spirit or scope of the present disclosure. The illustrative embodiments described in the detailed description are not meant to be limiting of the subject matter presented here.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

The knowledge ecosystem uses social network based ontological tools to enable individuals to connect and work together, and the knowledge ecosystem uses that capability and the associations based on expertise into the realm or flow of work. This can allow an individual to connect with the relevant people associated with the task at hand and to provide the needed knowledge or to uncover unknown knowledge.

The present disclosure describes a method and system for selecting team members or project resources to work on specific projects, which may be based on previous background and experience. The disclosed project resources may be identified and selected from a social network based, using a dynamic interface application. The new team member should match with the specific project attributes.

Particularly, project resources or team member(s) may be selected based on the level of knowledge/experience, which may be part of a suitable social network base. In one embodiment, the disclosed social network may include social elements in the user interface based on knowledge exchange, social theory of group memberships within an enterprise or organization context.

In another embodiment, group membership within an enterprise may be predicted upon many different types of relationships. For instance, as a business analyst, a person may belong to a business analyst community of practice based on a shared understanding of the work of business analysts; additionally, a person may belong to several project teams whose cultures are based on multi-disciplinary collaboration toward a common goal or outcome; also a person may belong to a business unit with a broader role in the enterprise; and to the corporate culture at large.

By understanding user needs for findability of knowledge held within individuals with certain expertise, a social network may be used as an effective tool in order to find those project resources that may fit according to the needs of specific projects.

Architecture of a Knowledge Ecosystem

FIG. 1 shows a system architecture 100 for a knowledge ecosystem in which one or more embodiments of the present disclosure may operate. The knowledge ecosystem described here may enable automated human-to-human collaboration through the use of system architecture 100. The disclosed system architecture 100 may include different components which may dynamically interact with each other through network connections 102. Network connections 102 may refer to any suitable connections between computers such as, for example, intranets, local area networks (LAN), virtual private networks (VPN), wireless area networks (WAN) and the internet among others.

In the knowledge ecosystem, one or more client computing devices 104 may display a graphical user interface 108 configured to receive information from one or more users and interact with one or more software modules 106. Examples of client computing devices 104 may include smartphones, desktop computers, laptop computers, tablets, and PDAs, among others. Software modules 106 may include any software used by key areas of an organization such as, for example, accounting software, human resources software, project management, organizational social networks, search engines and/or any other suitable software from where knowledge of an organization may be derived. In addition, each software module 106 may be executed by a server, a single computer or multiple computers in a distributed configuration.

User interface 108 displayed in client computing devices 104 may exhibit an intelligent feature for not only supporting human-computer interactions but also providing technology supported and socially enabled human-to-human collaboration for co-located and geographically diverse work teams alike. User interface 108 may act as a single portal for accessing different software modules 106 and may be tailored to users depending on the access rights predetermined for those specific users. In another embodiment, an independent user interface 108 may exist for each software module 106.

Interaction between client computing devices 104 and software modules 106 may generate raw data 110 such as user profiles, documents, project information, metrics, emails and worksheets among others. Software modules 106 may transmit raw data 110 through network connection 102 to a database 112 for storing. Database 112 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

External sources 114 may also feed raw data 110 to database 112. Examples of external sources 114 may include the world wide web, external social networks, external consulting, third party providers, external project sources and/or any external data that may serve to produce knowledge.

Finally, a knowledge management system 116 may manage and process the flow of information within the knowledge ecosystem. For example, knowledge management system 116 may retrieve and process raw data 110 stored in database 112 to consequently derive knowledge from raw data 110. Knowledge may then be stored in a knowledge base 118. Knowledge management system 116 may also pull knowledge from knowledge base 118 when requested by client computing devices 104 or software modules 106.

Knowledge management system 116 may include one or more computers suitable for executing knowledge management software according to embodiments described here. Knowledge base 118 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

Figure 2:
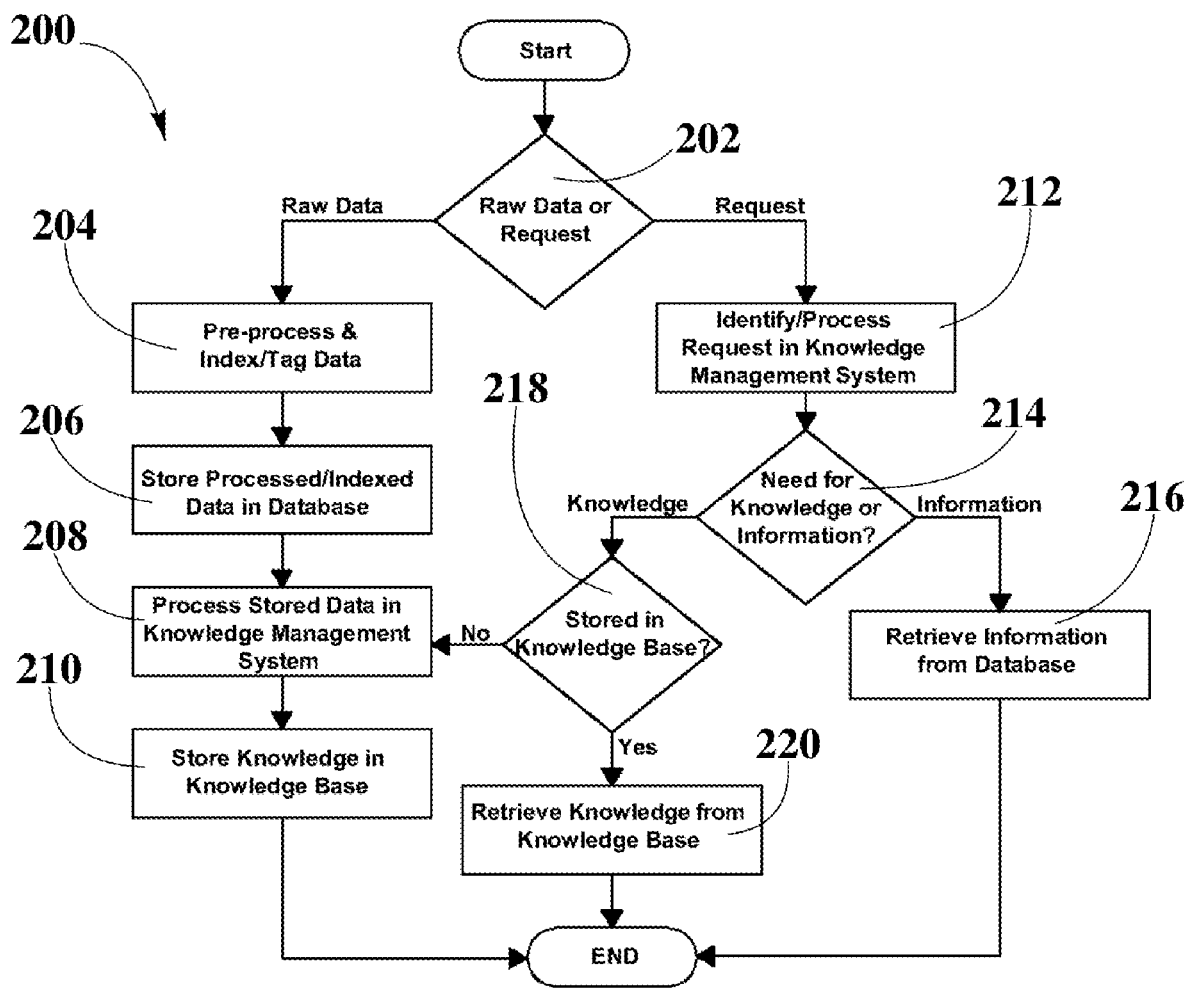
FIG. 2 is a flowchart of input/request management process, according to an embodiment.

FIG. 2 is a flowchart of input/request management process 200, according to an embodiment.

The process may start when raw data or requests may be generated from the interaction of one or more client computing devices with one or more software modules within a knowledge ecosystem. Examples of client computing devices may include smartphones, desktop computers, laptop computers, tablets, and PDAs, among others. Software modules may include any software used by key areas of an organization such as, for example, accounting software, human resources software, organizational social networks, project management, search engines and/or any other suitable software from where knowledge of an organization may be derived. In addition, each software module may be executed by a server, a single computer or multiple computers in a distributed configuration.

Raw data may include user profiles, documents, project information, metrics, emails and worksheets, among others. Requests may include the demand for information or knowledge.

Software modules may classify between raw data or requests, at step 202. Subsequently, at step 204, software modules may send raw data to a database where one or more sets of raw data may be analyzed, classified, indexed, and tagged using one or more information processing algorithms designed to process one or more types of data, allowing the conversion of raw data into preprocessed information. In some embodiments, this process may be done using state of the art data mining, and other suitable data processing tools. The database may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The database may store the preprocessed information at step 206, until a knowledge management system determines that there is a need for analyzing one or more sets of preprocessed information. Knowledge management system may include one or more computers suitable for executing knowledge management software according to embodiments described here.

The need for analyzing one or more sets of preprocessed information may arise from a client computing device generated request or from a software module generated request. If the knowledge management system determines there is a need for new knowledge within the knowledge ecosystem, knowledge management system may analyze one or more sets of preprocessed information according to the identified knowledge needs, at step 208. In some embodiments, knowledge management system may use additional processing tools from one or more software modules during the analysis of preprocessed information.

Following step 208, knowledge management system may analyze and compare one or more sets of processed information against one or more knowledge needs identified within the knowledge ecosystem. Knowledge management system may identify knowledge from the processed information, where this knowledge may be useful for improving the performance of one or more tasks in a project. At step 210, the knowledge management system may store the identified knowledge in a knowledge base and the process may end. In some other embodiments, knowledge management system may store only indexed references or tags of the one or more useful processed information sets or subsets in knowledge base.

Knowledge base may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

At step 202, software modules may send requests to the knowledge management system for analysis, at step 212. Knowledge management system may classify the requests to determine if there is a need for knowledge or for information, at step 214. In one embodiment, information may refer to facts or details about users, tasks, projects, and general activities within the knowledge ecosystem. In one embodiment, knowledge may refer to information, acquired, processed or derived by client computing devices, software modules, and knowledge management system, where this information may be useful for improving one or more tasks in one or more projects.

Following the process, if there is a need for information, knowledge management system may retrieve the necessary one or more sets or subsets of information from the database, at step 216, and the process may end.

If there is a need for knowledge, knowledge management system may determine if the necessary knowledge to address the identified need is already stored in the knowledge base, at step 218. If the necessary knowledge is already stored in the knowledge base, then knowledge management system may retrieve the required knowledge from the knowledge base, at step 220. If necessary knowledge is not yet stored in the knowledge base, knowledge management system may retrieve and analyze one or more sets of preprocessed data from the database and subsequently store identified knowledge in knowledge base, at step 210, and the process may end.

Figure 3:
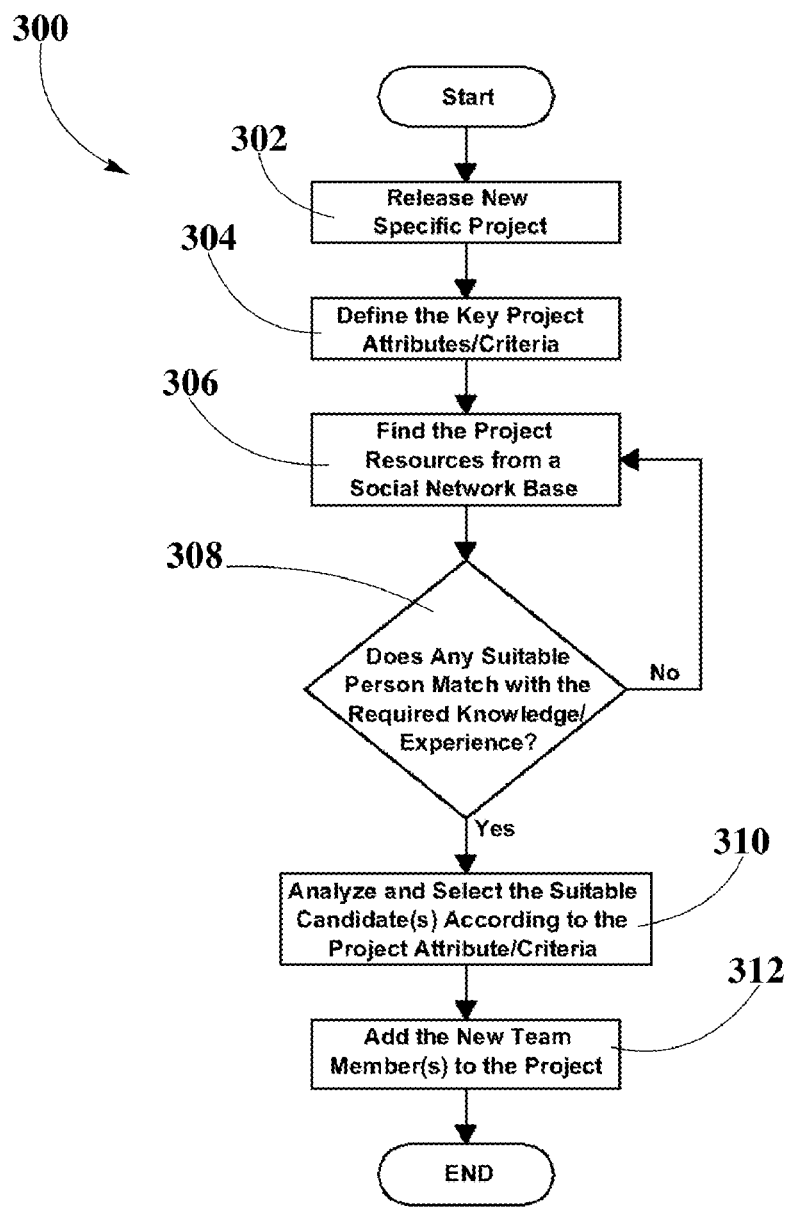
FIG. 3 is a flowchart for the selection of project team members, according to an embodiment.

FIG. 3 is a flowchart 300 for the selection of project team members, according to an embodiment. More specifically, flowchart 300 may describe the process for selecting the project resources (team members) based on the use of social networks, project attributes/criteria, and people domain knowledge or experience. In addition flowchart 300 process may be executed through a software module in a knowledge ecosystem. The social network may be a software module that through a client computing device may receive, store, process, analyze and provide qualitative and quantitative information related to project sources (project team members).

According to an embodiment, in the knowledge ecosystem, one or more client computing devices may display a graphical user interface configured to receive information regarding to projects from one or more users and interact with the social network. Afterwards, the project information may be released 302 into knowledge ecosystem, where the client computing device may allow one or more users to define project attributes 304, which may be analyzed from a broad to a specific point of view. Subsequently, the user may search or find project resources 306 using the social network, where the disclosed social network may include social elements (e.g. contacts, online chat, information sharing, and social communities, among others). The social elements may be used for the interaction and/or communication between two or more people through a same user interface. The user interface may be designed based on social theory of group memberships within the enterprise/organization context. Additionally, the system may automatically match 308 the associated characteristics (domain knowledge) of each individual from the social network with the required attributes or criteria related to the specific project.

Consequently, if there is a match 308 result between the project attributes/criteria and the domain knowledge and experience of any suitable individual(s) on the social network. Subsequently, the user interface through the social network may allow user (a professional expertise) analyze/select 310 the most suitable members or individuals. Afterwards, the social network may add 312 the information related to the most suited individual(s) associated to the project team on the social network's database. However, if there is no match between the project attributes/criteria and the domain knowledge and experience of any suitable individual(s) on the social network, the user then may get back to find project resources 306.

Figure 4:
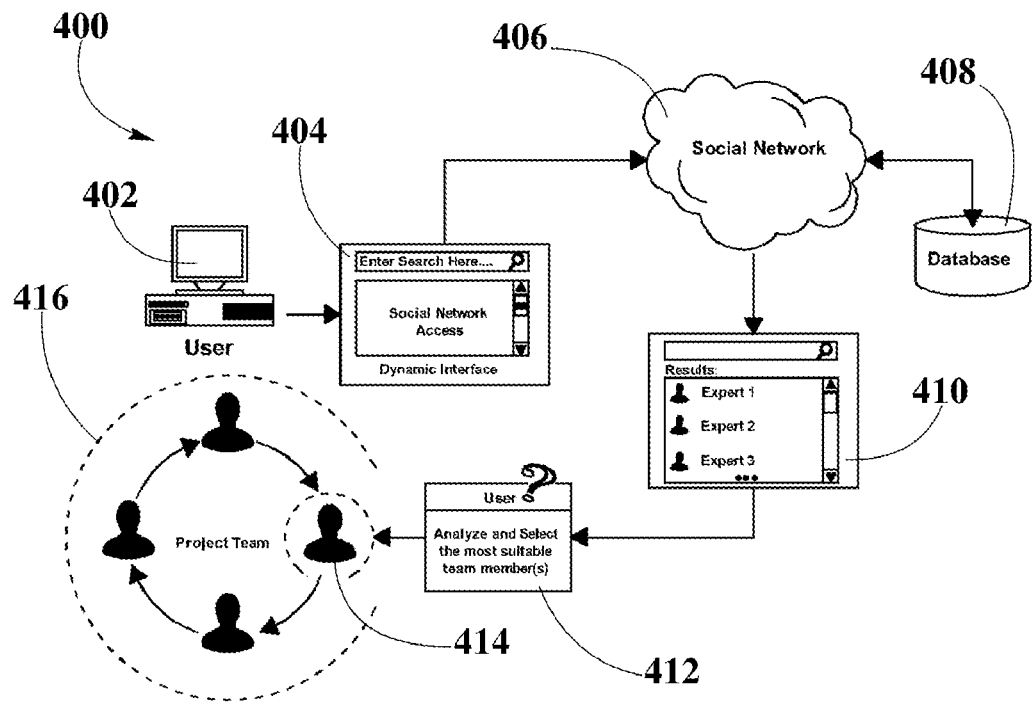
FIG. 4 illustrates a block diagram of a search/selection for new team members, according to an embodiment.

FIG. 4 illustrates a block diagram 400 of a search/selection for new team members, according to an embodiment. More specifically, the system may allow multiple users 402 each including computing devices (e.g. smartphone, tablet, laptop, and personal computer, among others) to be connected in a same network to a server where multiple users 402 may be using a similar platform. One or more users 402 may access to the social network by social network interface 404 where one or more users 402 may have a computing device displaying a graphical user interface configured to receive/provide information from one or more users 402. The received information may be qualitative or quantitative parameters or criteria that may be related to any suitable project. Subsequently, during a social network connection 406 the system may automatically search the suitable individual(s) that fit according to the needs of the specific project. Social network database 408 may include the list of suitable candidates or team member(s) that knowledge management system through social network may select as being suitable for a project. The disclosed social network interface 404 may be included in a software module within a knowledge ecosystem architecture.

The disclosed social network database 408 may operate independently with respect to other databases described in the knowledge ecosystem architecture. Additionally, social network database 408 may refer to a database implemented in known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

According to another embodiment, the knowledge management system may select through the social network the suitable candidate according to the project attributes, such as project criteria, methodology that may be used, the type of costumer, and product, among others.

Once the system finds the right individual(s), the system may show search result 410 of one or more individuals profiles with their respective information in term of domain knowledge and experience among other attributes, such as experience, passion, emotional intelligence, connectivity, creativity, analytical skills, availability, recommendations, preparedness, and influence, among others. Afterwards, user 402 through a computing device at step of selection process 412 may analyze and select from a list of candidate coming from search result 410 the suitable new member 414 that may be included into project team 416. The disclosed project team 416 members may include a multi-disciplinary group, such as UX (User experience) analysts & designers, knowledge analysts, business analysts, architects, tech designers/lead developer, developers, project manager, process analysts, test analysts, test engineers, and readiness analysts, among other roles.

Social Network Concept

Because of the matrixed nature of work in a large enterprise or organization environment, group membership may be predicated upon many different types of relationships. For instance, if new member 414 is a business analyst, the disclosed individual may belong to the business analyst community of practice based on a shared understanding of the work of business analysts; may belong to several project teams 416 whose cultures are based on multi-disciplinary collaboration toward a common goal or outcome; may also belong to a business unit with a broader role in the enterprise; and to the corporate culture at large.

Figure 5:
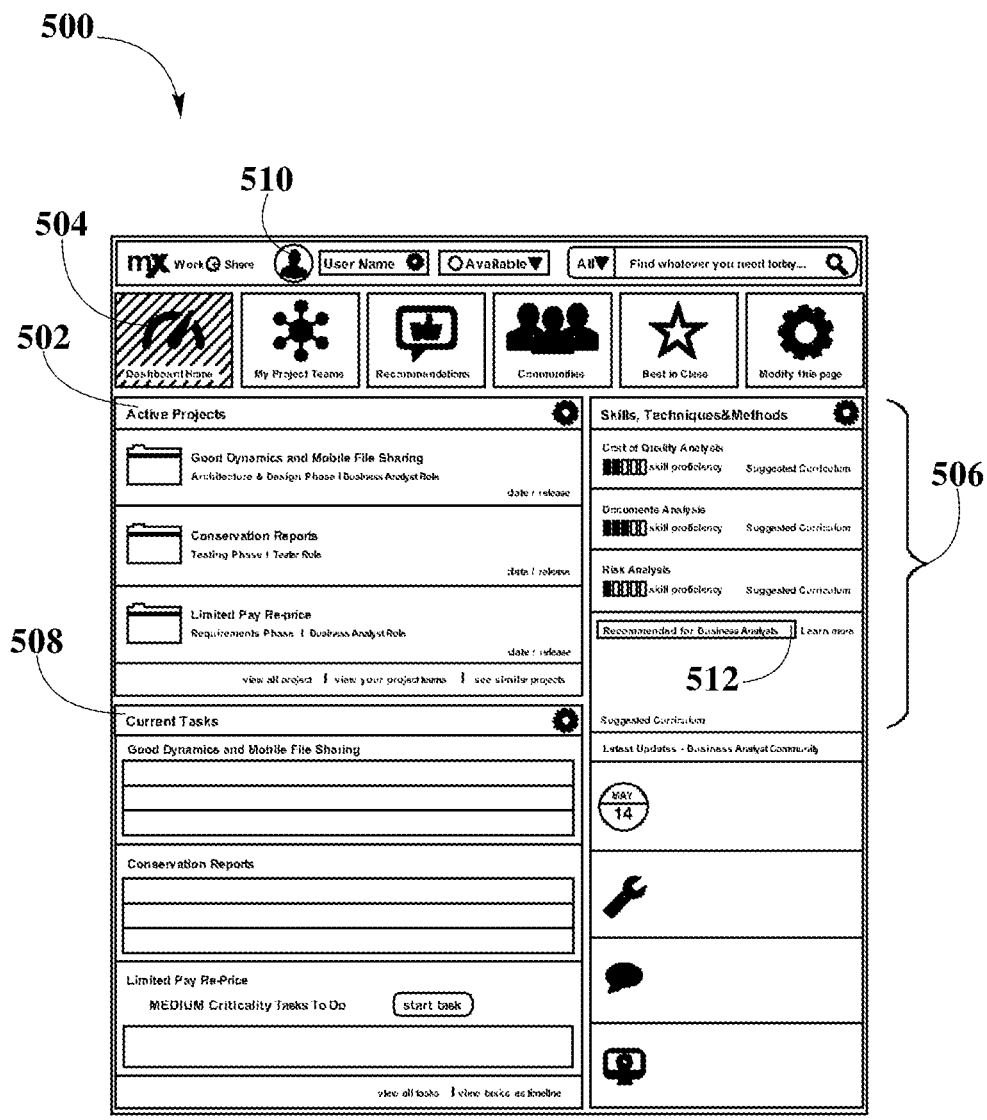
FIG. 5 illustrates an interface design showing the ranking system to select potential project resources, according to an embodiment.

FIG. 5 illustrates a user interface 500, according to an embodiment. User interface 500 may be configured according to the tasks and operations performed in one or more software modules within a knowledge ecosystem. Software modules may generate user interface 500 through suitable computing devices such as a desktop computers, workstations, and servers running any suitable operating systems and software packages. User interface 500 may be displayed in one or more client computing devices such as smartphones, tablets, laptop computers, desktop computers, and PDAs, among others.

User interface 500 may display a dashboard home 502 which may include qualitative and quantitative information about active projects 504, skills and techniques 506, and current tasks 508.

Active projects 504 may include information about status, roles and project reports. Skills and techniques 506 may include an analysis, assessment, and ranking of the abilities of a particular member or user 510 related to a particular project. For example, user 510 may be ranked in different skills and techniques 506 such as cost analysis, document analysis, and risk analysis, where user 510 may rank higher in document analysis skill as depicted in FIG. 5. These rankings may be used for making suitable role recommendation 512, as in this particular example, user 510 may be recommended for Business Analyst.

Current tasks 508 may include file sharing, reports, reviews, and status of critical tasks to do in a project. User interface 500 may also display other tabs related to project teams, recommendations, communities, best in class, and settings, among others.

The disclosed skills and techniques 506 information aforementioned may be used as qualitative and quantitative parameters to selection a new team member for a project team.

Figure 6:
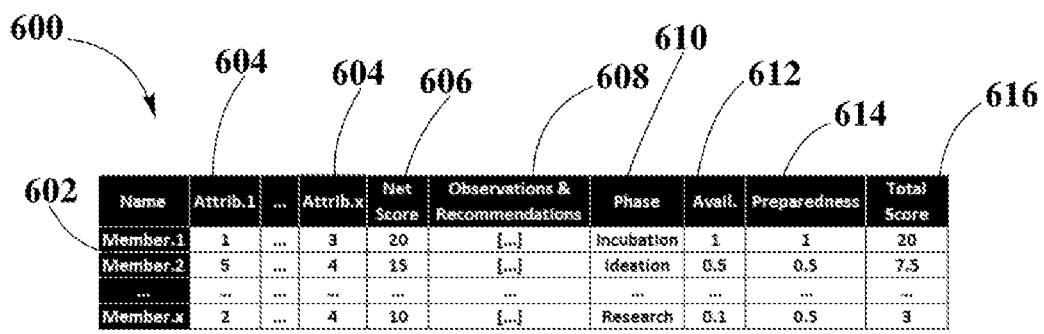
FIG. 6. is a table used for project team selection according to an exemplary embodiment.

FIG. 6 depicts a table, which is described in Example #3, for a project's team selection. Table 600 includes a set of team members 602 in the rows. Table 600 may also include a set of attributes 604, a net score 606, observations and recommendations 608, a project's phase 610, an employees' availability weight 612, an employees' preparedness weight 614 and a total score 616 field in the columns.

Example #1 is an embodiment of social network interface 404 where the most suitable candidates for each project team 416 may be selected according to psychographic information, such as attitude and motivation about work. The disclosed information may also include the behavior of the candidates toward a previous project, such as the candidate's behavior when receiving information of certain projects situations or when work had to be redone under certain circumstances.

Example #2 is an embodiment of social network interface 404 where the project attributes may be identified/associated according to contribution values with respect to each individuals attributes.

Example #3 is an embodiment of a team selection method shown in FIG. 6. Table 600 may include a set of attributes 604 for each employee. The assignment engine may associate a score with each employee's attributes based on matching probabilities to specific project's attributes. Then, the disclosed a example, the summation of the scores assigned to member 1 leads a score equal to 20, at net score 606. Given that availability weight 612 and preparedness weight 614 are both equal to 1, may yield a result equal to 20, at total score 616 column. Similarly, member 2 presents a score equal to 15, at net score 606. Taking into account that availability weight 612 and preparedness weight 614 are both equal to 0.5, which may yield a result equal to 7.5, at total score 616 column. In this example, the members are already sorted in descending order according to total score 616. Any suitable type of observation or recommendation may be included at observations and recommendations 608 column either by a knowledge management system or by a decision maker, for example, if an employee display certain behaviors he/she may be recommended for a certain position or for a specific phase of the project.

The exemplary methods can improve operational efficiency of the knowledge management system. In one embodiment, a computer-implemented method comprises receiving, by a computer, an input of a plurality of project attributes for a project; generating, by the computer, a record of the project having the plurality of project attributes; searching, by the computer, a social network base to match at least one of the project attributes in the record of the project with an individual associated with knowledge in a record in the social network base, wherein the knowledge has at least one of the project attributes; and in respond to searching, automatically generating, by a computer, a record of a team by selecting the individual as a team member of the project when there is a match.

In another embodiment, a system comprises a social network database; a terminal configured to provide an interface to the social network database, receive at least one parameter for a project, and search the social network for an individual associated with knowledge that satisfies the at least one parameter; and a database configured to store records for a plurality of individuals, provide information to the terminal about the plurality of individuals when the terminal is searching the social network database, and update the records to associate at least one of the individuals with the project when the individual is associated with knowledge that satisfies at least one parameter of the project.

In yet another embodiment, a computer-implemented method comprises receiving, by a computer, an input of at least one project having involvement by a user; determining, by the computer, a plurality of attributes of the user in a record of the user; analyzing, by the computer, each of the at least one project and the plurality of attributes of the user to determine a set of skills for each of the at least one project; and displaying, by the computer, a graphical user interface to the user presenting a skill level of the user compared to the set of skills.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method for identifying a user based upon the user's social media interactions, the method comprising:

monitoring, by a server, data generated from a plurality of interactions between a set of computing devices operated by a set of users and a social networking platform hosted by the server;

tagging and indexing, by the server, the monitored data to identify one or more attributes associated with each user within the set of users;

receiving, by the server from a computer, a request for one or more users associated with a project, the request comprising an input of at least one project attribute;

generating, by the server, a first score for each user within the set of users, each first score corresponding to a probability of each user's attributes matching with the at least one project attribute;

generating a second score for each user, the second score corresponding to an availability of each user for the project;

displaying, by the server, a graphical user interface on the computer, the graphical user interface comprising an indication of each user within a subset of the set of users satisfying a first score threshold, or a second score threshold, and at least one of the first or second scores generated for each respective user within the subset of the set of users; and upon receiving a selection of at least one user within the subset of the set of users, associating, by the server, a data record corresponding to the selected user with the project.

2. The computer-implemented method according to claim 1, wherein the first score corresponds to data generated based on each user's interactions with the social networking platform that is tagged and indexed by the server for each user, the first score not being based on a profile of each user.

3. The computer-implemented method according to claim 1, wherein the first score corresponds to:
data generated based on each user's interactions with the social networking platform that is tagged and indexed by the server for each user, and
a profile of each user.

4. The computer-implemented method according to claim 1, wherein the server generates a third score for each user, the third score corresponding to a preparedness of each user.

5. The computer-implemented method according to claim 4, wherein the server assigns a weight to the first score, the second score, and the third score for each user, the server further generating a net score for each user based on a weighted first score, a weighted second score, and a weighted third score for each user.

6. The computer-implemented method according to claim 1, further comprising ranking, by the server, each user within the subset of the set of users.

7. The computer-implemented method according to claim 6, wherein the ranking is based on at least one of each user's respective first score, or one or more skills and techniques required to execute the project.

8. The computer-implemented method according to claim 1, wherein the server automatically selects a predetermined number of users within the subset of the set of users to be associated with the project.

9. The computer-implemented method according to claim 1, wherein the first score corresponds to a probability of each user's attributes matching with a single attribute associated with the project.

10. The computer-implemented method according to claim 1, wherein the graphical user interface further comprises a phase associated with the project, wherein the server generates the first score for each user for each phase of the project.

11. A computer system for identifying a user based upon the user's social media interactions, the system comprising a server comprising a processor and a non-transitory computer-readable medium containing instructions that when executed by the processor causes the processor to perform operations comprising:

monitor data generated from a plurality of interactions between a set of computing devices operated by a set of users and a social networking platform hosted by the server;

tagging and indexing, by the server, the monitored data to identify one or more attributes associated with each user within the set of users;

receive, from a computer, a request for one or more users associated with a project, the request comprising an input of at least one project attribute;

generate a first score for each user within the set of users, each first score corresponding to a probability of each user's attributes matching with the at least one project attribute;

generate a second score for each user, the second score corresponding to an availability of each user for the project;

display a graphical user interface on the computer, the graphical user interface comprising an indication of each user within a subset of the set of users satisfying a first score threshold, or a second score threshold, and at least one of the first or second scores generated for each respective user within the subset of the set of users; and upon receiving a selection of at least one user within the subset of the set of users, associate a data record corresponding to the selected user with the project.

12. The system according to claim 11, wherein the first score corresponds to data generated based on each user's interactions with the social networking platform that is tagged and indexed by the server for each user, the first score not being based on a profile of each user.

13. The computer system according to claim 11, wherein the first score corresponds to:
data generated based on each user's interactions with the social networking platform that is tagged and indexed by the server for each user, and
a profile of each user.

14. The computer system according to claim 11, wherein the server generates a third score for each user, the third score corresponding to a preparedness of each user.

15. The computer system according to claim 14, wherein the server assigns a weight to the first score, the second score, and the third score for each user, the server further generating a net score for each user based on a weighted first score, a weighted second score, and a weighted third score for each user.

16. The computer system according to claim 11, further comprising ranking, by the server, each user within the subset of the set of users.

17. The computer system according to claim 16, wherein the ranking is based on at least one of each user's respective first score, or one or more skills and techniques required to execute the project.

18. The computer system according to claim 11, wherein the server automatically selects a predetermined number of users within the subset of the set of users to be associated with the project.

19. The computer system according to claim 11, wherein the first score corresponds to a probability of each user's attributes matching with a single attribute associated with the project.

20. The computer system according to claim 11, wherein the graphical user interface further comprises a phase associated with the project, wherein the server generates the first score for each user for each phase of the project.

* * * * *